UNITED STATES PATENT OFFICE.

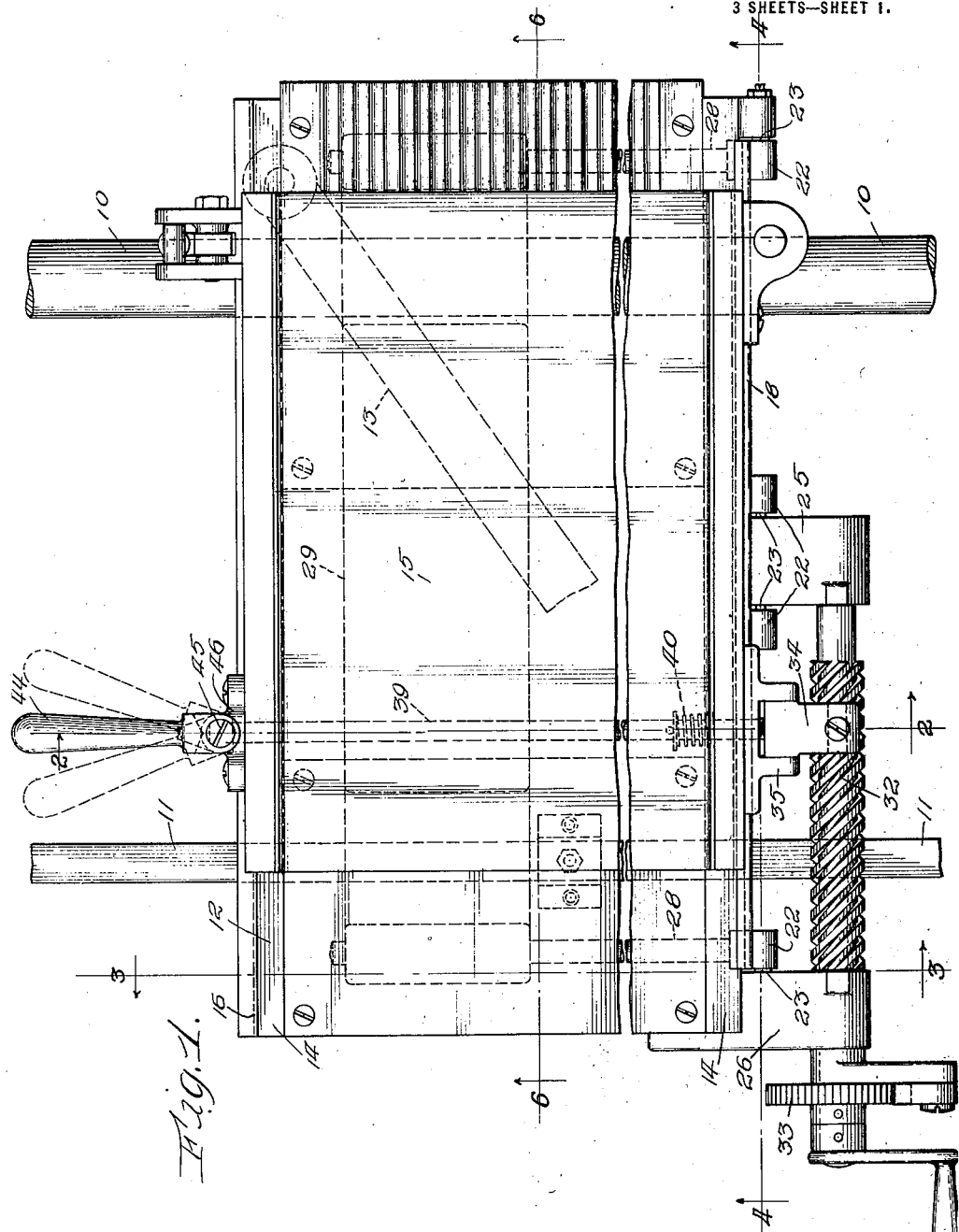

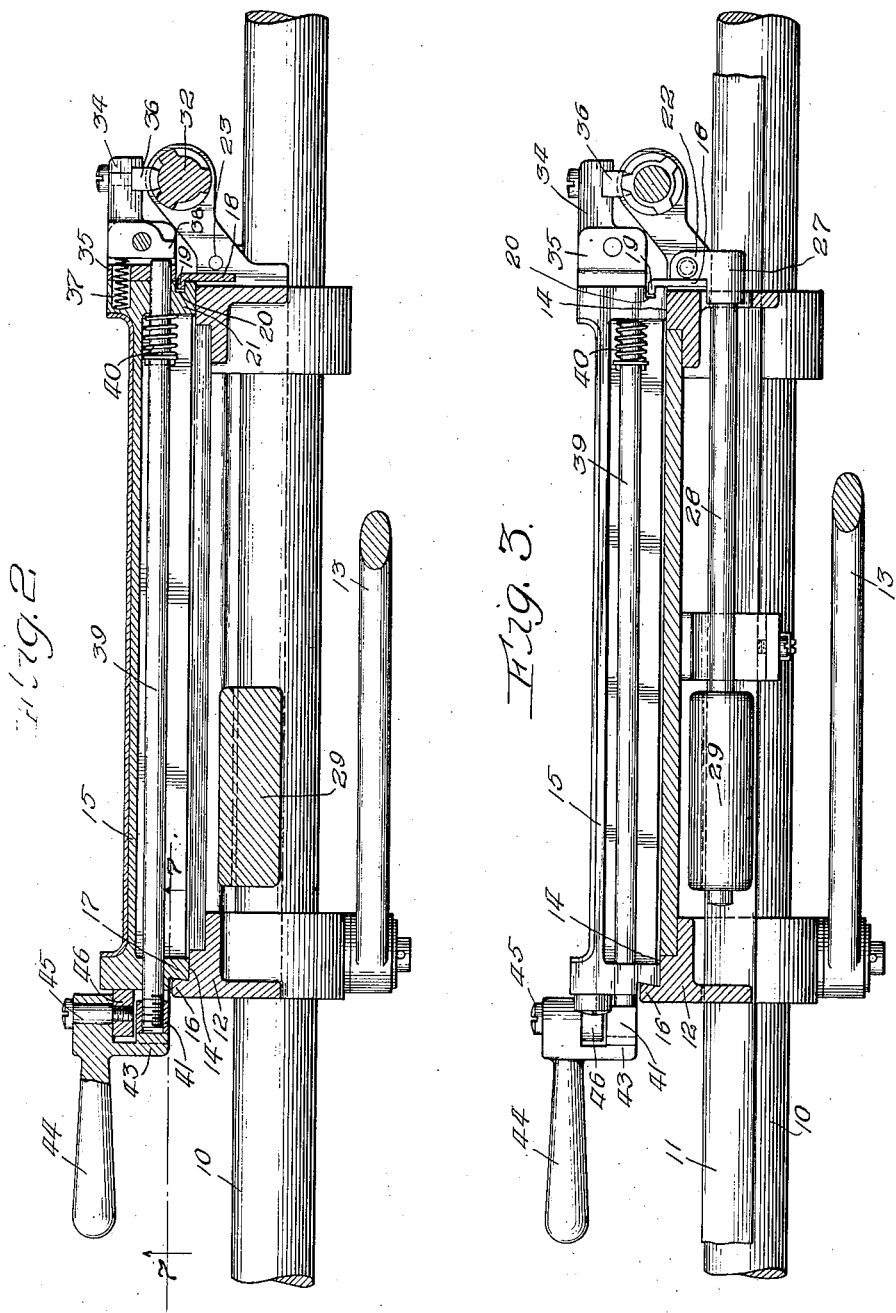

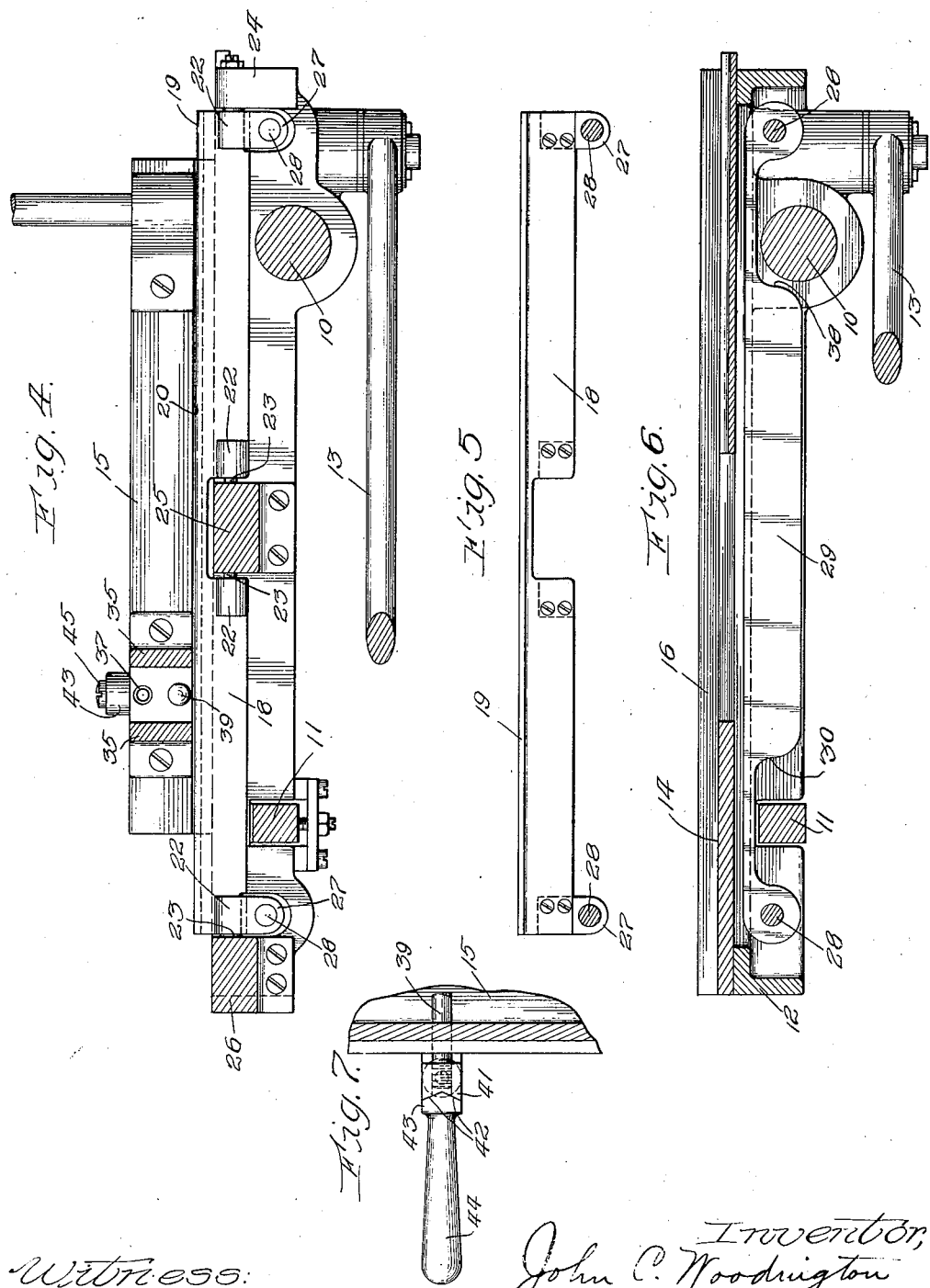

JOHN C. WOODINGTON, OF LAPORTE, INDIANA, ASSIGNOR TO U. S. SLICING MACHINE COMPANY, OF LAPORTE, INDIANA, A CORPORATION OF INDIANA.

SLICING-MACHINE.

1,330,292.

Specification of Letters Patent.   Patented Feb. 10, 1920.

Application filed July 18, 1918. Serial No. 245,488.

*To all whom it may concern:*

Be it known that I, JOHN C. WOODINGTON, a subject of the King of England, who has declared his intention of becoming a citizen of the United States, residing at Laporte, in the county of Laporte and State of Indiana, have invented certain new and useful Improvements in Slicing-Machines, of which the following is a specification.

This invention has for its object the provision of a device of the class named which shall be of improved construction and operation.

The invention is exemplified in the combination and arrangement of parts shown in the accompanying drawings and described in the following specification, and it is more particularly pointed out in the appended claims.

In the drawings—

Figure 1 is a top plan view of the work carriage for slicing machines embodying one form of the present invention.

Fig. 2 is a vertical section on line 2—2 of Fig. 1.

Fig. 3 is a vertical section on line 3—3 of Fig. 1.

Fig. 4 is a vertical section on line 4—4 of Fig. 1.

Fig. 5 is a detail of a friction plate forming a part of the invention.

Fig. 6 is a vertical section on line 6—6 of Fig. 1; and

Fig. 7 is a fragmentary horizontal section on line 7—7 of Fig. 2.

In slicing machines of standard make it is usual to provide reciprocating work tables which carry the meat, or other material to be sliced past a rotary slicing blade, the material being clamped to a sliding meat plate supported upon the reciprocating carriage or under table. The meat plate is fed forwardly across the under table a short distance after each reciprocation of the table in order to move the material upon the plate a sufficient amount to present the thickness of a new slice to the knife during the succeeding reciprocation of the table.

In the drawings, the numerals 10 and 11 designate the guide bars or ways upon which the work carriage or under table 12 is mounted to reciprocate. The table 12 is moved along the ways 10 and 11 by a pitman 13 which is operated by a rotary crank in a manner well known in the art. The table 12 is provided with a pair of slideways 14 which extend transversely of the direction of the reciprocation of the table and upon which the meat plate 15 is slidably mounted. One slideway 14 is provided at one side with an upwardly projecting rib 16 which bears against a guide 17 on the lower surface of the meat plate 15 and holds the plate from moving laterally on the slideway 14. The guides 16 and 17 have their contacting surfaces slightly inclined or dovetailed to resist upward movement of the meat plate away from the under table.

At the side of the meat plate, opposite the guides 16 and 17, a friction plate 18 is mounted having an overhanging flange 19 which projects into a groove 20 formed in the side of a guide 21 for supporting the side of the meat plate which rests upon the slideway 14. The friction plate 18 is secured to lugs 22 which are supported by pivots 23 journaled in bearing blocks 24, 25 and 26 rigidly secured to the under table 12. The end lugs 22 are provided with downwardly projecting portions 27 which carry horizontally extending bars 28 which project beneath the meat plate, as shown in Fig. 3, and supported at their inner ends is a weight 29 which extends beneath the meat plate in the position shown in broken lines in Figs. 1 and 6. The weight 29 is recessed, as shown at 30 and 31, in order to clear the ways 10 and 11. It will be obvious that the weight 29 will tend to press the friction plate 18 against the guide 21 and thus produce a braking action upon the meat plate 15, offering a resistance to the sliding movement of the plate upon the table for a purpose which will be explained. When it is desired to remove the meat plate from the under table, the plate may be pressed slightly to the right, as viewed in Fig. 2, the friction plate 18 yielding sufficiently under this pressure to permit the inclined surfaces of the guides 16 and 17 to clear each other when the edge of the plate at the left of Fig. 2 is raised upwardly. After the guides 16 and 17 are clear of each other, the plate may then be drawn slightly to the left to free the opposite edge of the plate from the friction member 18, and the plate may then be lifted bodily from its support.

The meat plate is fed across the under table by means of a screw 32 which is journaled in brackets 25 and 26 and which is given a slight rotary movement at each reciprocation of the table by ratchet mechanism 33 in a manner well known in the art.

A block 34 is pivoted in a bracket 35 carried at the edge of the meat plate 15 and is provided with a half nut 36 which carries teeth arranged to mesh with the threads on the screw 32. A spring 37 normally holds the half nut 36 in mesh with the screw. The block 34 is provided with a downwardly projecting arm 38 which bears against the end of a rod 39 slidably carried beneath the meat plate 15 and provided with a spring 40 which normally holds the end of the rod 39 in a retracted position to permit engagement between the half nut 36 and screw 32. The end of the rod, opposite the half nut, is provided with a cam block 41 into which the end of the rod is threaded so that the block may be adjusted slightly longitudinally of the rod. The cam block 41, as shown more clearly in Fig. 7, is notched to provide inclined bearing surfaces 42 into which a V-shaped projection 43 on a hand lever 44 is shaped to fit. The lever 44 is connected by a pivot screw 45 to a bracket 46 secured to the edge of the meat plate 15.

When it is desired to shift the meat plate upon the under table independently of the feed screw 32, the operator grasps the hand lever 44 and simply pulls the table in the direction in which he wishes it to be moved. The first effect of this operation is to swing the lever 44 about its pivot so that the cam surface 42 forces the rod 39 to the right, as viewed in Fig. 2, and thus lifts the half nut 36 clear of the feed screw. The lever 44 will then stand in one or the other of the broken line positions shown in Fig. 1, and the plate will be free from the feed screw so that further movement of the lever will draw the table along its guideways into any position desired by the operator. Thus by a single operation the plate is released from the feed screw and adjusted upon its guides.

The friction plate 18 in addition to forming a guide at one side of the meat plate 15, is for the purpose of producing a braking action upon the meat plate to overcome backlash in the feed screw. After the feed screw becomes slightly worn, or if the connection between the half nut and the meat plate permits of a little play, the meat plate 15 will be free to move slightly upon its guideways independently of the rotation of the screw 32. During a feeding operation the plate, of course, will be as far back along the guideways as the screw will permit, because it is being fed forwardly by the screw. When the knife begins to sever a slice, however, there is a tendency on the part of the knife to draw the meat forwardly toward the knife because of the particular shape given the knife edge. If the table slides easily upon its guides, this tension produced by the operation of the knife will move the table forwardly as far as any backlash of the screw will permit, and thus slices of uneven thickness will be produced. In order to prevent this difficulty the friction plate 18 is provided which offers sufficient resistance to the sliding movement of the meat plate to overcome any tension produced by the knife during the cutting of a slice, and thus the plate is continually held firmly against the feed screw, and any lost motion in the plate is prevented. The lever and weight arrangement used to produce the friction between the two plates is an especially effective arrangement because of the fact that the weight maintains a constant pressure between the two contacting parts, and when the proper proportions have once been secured for maintaining the pressure necessary to overcome the forward tension produced by the knife in cutting slices, this pressure will remain constant and never be changed by wear or use.

I claim:—

1. In a slicing machine, a support, a holder for material to be sliced movably mounted on said support, mechanism for feeding said holder on said support, and a friction device for opposing the movement of said holder relative to said support to prevent lost motion between said holder and its feeding mechanism.

2. In a slicing machine, a support, a work holder movably mounted on said support, mechanism for feeding said work holder relative to said support, and a weight-actuated friction device for opposing the movement of said holder relative to said support to maintain a close operating relation between said holder and its feeding mechanism.

3. In a slicing machine, a support, a work holder movably mounted upon said support, a screw for feeding said holder relative to said support, and a weight-actuated friction device for engaging said holder to overcome the effect of backlash in said screw.

4. In a slicing machine, a support, a work holder slidably mounted upon said support, a screw for feeding said work holder along said support, a toothed member connected with said work holder and removably engaging said screw, and a weight-actuated friction device engaging said work holder for resisting the movement of said holder under the influence of said screw to overcome the effect of lost motion between said screw and work holder.

5. In a slicing machine, a support, a work holder slidably mounted upon said support, a screw journaled in said support and connected with said work holder for feeding said work holder along said support, an elongated friction member pivotally mounted on said support and arranged to engage said work holder, a lever arm connected with said friction member, and a weight carried by said lever arm for causing said friction member to press against said work holder.

6. In a slicing machine, a support, a work holder slidably mounted on said support, an inclined guide at one edge of said support, a movable guide at the opposite edge of said support, and means for exerting pressure upon said movable guide to hold said work holder against said inclined guide and to produce a braking action between said movable guide and said work holder.

7. In a slicing machine, a support, a work holder mounted to slide upon said support, an inclined guide carried by said support for engaging said work holder at one edge thereof, an upright friction member pivotally mounted upon said support for engaging the opposite edge of said work holder, a weight connected with said friction member for causing said member to press against said work holder, and an overhanging projection on said friction member for preventing upward movement of said work holder relative to said support.

8. In a slicing machine, a support, a work holder slidably mounted upon said support, a screw for feeding said work holder along said support, a friction member for resisting the movement of said holder relative to said support, a handle for sliding said work holder on said support against the resistance of said friction member, and means operated by said handle for breaking the connection between said screw and work holder.

9. A slicing machine comprising a support, a work holder slidably mounted on said support, a screw for feeding said work holder along said support, a half nut for engaging the said screw, a handle connected with said work holder for moving said holder along said support, and means operated by said handle for disconnecting said half nut from said screw when force is exerted upon said handle for moving said work holder in either direction upon said support.

10. In a slicing machine, a support, a work holder slidably mounted upon said support, mechanism for feeding said work holder relative to said support, a manually operated device for moving said work holder upon said support, and means operated by said device for releasing said work holder from said feeding mechanism when said device is operated to move said holder in either direction upon said support.

11. In a slicing machine, a support, a work holder slidably mounted upon said support, a screw for feeding said holder upon said support, a weight-actuated friction device for resisting the feeding movement of said screw, a half nut pivotally mounted on said work holder for engaging said screw, a handle pivotally mounted on said work holder, and means connected with said handle for releasing said half nut from said feed screw when said handle is moved slightly upon its pivotal connection with said work holder and for preventing further movement of said handle upon its pivot after the release of said half nut so that continued force exerted upon said handle will slide said holder upon said support.

In testimony whereof I have signed my name to this specification on this 11th day of July, A. D. 1918.

J. C. WOODINGTON.